United States Patent
Mons

(10) Patent No.: US 7,196,976 B2
(45) Date of Patent: *Mar. 27, 2007

(54) ACCESSING AUDIO-CENTERED INFORMATION USING A MULTI-LEVEL TABLE-OF-CONTENTS MECHANISM AND DIRECTORY STRUCTURES

(75) Inventor: Johannes J. Mons, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 10/039,713

(22) Filed: Oct. 29, 2001

(65) Prior Publication Data

US 2002/0064102 A1 May 30, 2002

Related U.S. Application Data

(63) Continuation of application No. 09/355,379, filed on Jul. 26, 1999, now Pat. No. 6,353,580.

(30) Foreign Application Priority Data

Nov. 29, 1997 (EP) .................................. 97203746

(51) Int. Cl.
G11B 21/08 (2006.01)

(52) U.S. Cl. .................................. 369/30.04; 369/275.3

(58) Field of Classification Search ............. 369/30.04, 369/30.07, 30.08, 30.09, 30.27, 275.3; 386/125, 386/126
See application file for complete search history.

(56) References Cited

U.S. PATENT DOCUMENTS

| 5,210,734 | A | * | 5/1993 | Sakurai ........................ 369/49 |
| 5,384,674 | A | * | 1/1995 | Nishida et al. ............. 360/72.2 |
| 5,650,991 | A | * | 7/1997 | Fujiie ....................... 369/275.4 |
| 5,754,521 | A | * | 5/1998 | Yokota ..................... 369/275.3 |
| 5,848,038 | A | * | 12/1998 | Igarashi ....................... 369/54 |
| 5,867,466 | A | * | 2/1999 | Igarashi et al. ................ 369/58 |
| 6,016,295 | A | * | 1/2000 | Endoh et al. .................. 369/49 |
| 6,072,759 | A | * | 6/2000 | Maeda et al. ................. 369/59 |
| 6,275,457 | B1 | * | 8/2001 | Maeda .................... 369/47.21 |
| 6,370,090 | B1 | * | 4/2002 | Verbakel et al. ......... 369/30.04 |
| 6,522,695 | B1 | * | 2/2003 | Bruekers et al. ............ 375/259 |

* cited by examiner

Primary Examiner—Tan Dinh
(74) Attorney, Agent, or Firm—Michael E. Belk

(57) ABSTRACT

Audio-centered information is stored on a unitary medium by a Table-of-Contents (TOC) mechanism for specifying an actual configuration of various audio items on the medium. In addition to the TOC mechanism a file-based access mechanism to the information is assigned through a ROOT directory that contains a highest level TOC directory pointing at various audio items.

65 Claims, 4 Drawing Sheets

```
                              # bytes              format
Master_TOC ( ) {
    Master_TOC_0 ( )          2048                 Master_TOC_0
    for (c=1;c<=8; c++)
    {
        Master_Text [c]       2048                 Master_Text
    }
    Manuf_Info ( )            2048                 Manuf_Info
}
```

FIG. 7A
(Table 1)

```
                              # bytes              format              value
Master_TOC_0 ( ) {
    M_TOC_0_Header ( )        16                   M_TOC_0_Header
    Album_Info ( )            48                   Album_Info
    Disc_Info ( )             64                   Disc_Info
    Text_Channels ( )         40                   Text_Channels
    Reserved                  until 2048           Uint8               0
}
```

FIG. 7B
(Table 2)

```
                              # bytes              format              value
Disc_Info ( ) {
    2CH_TOC_1_Address         4                    Uint32
    2CH_TOC_2_Address         4                    Uint32
    MC_TOC_1_Address          4                    Uint32
    MC_TOC_2_Address          4                    Uint32
    Disc_Flags ( )            1                    Disc_Flags
    Reserved                  3                    Uint8               0
    2CH_TOC_Len               2                    Uint16
    MC-TOC_Len                2                    Uint16
    Disc_Catalog_Number       16                   String
    Disc_Genre ( )            16                   Genre4
    Disc_Date                 4                    Date
    Reserved                  4                    Uint8               0
    /*** Disc text files are in Master_Text [c] with c=1..8***/
}
```

FIG. 7C
(Table 3)

ACCESSING AUDIO-CENTERED INFORMATION USING A MULTI-LEVEL TABLE-OF-CONTENTS MECHANISM AND DIRECTORY STRUCTURES

CROSS REFERENCE TO RELATED APPLICATIONS

This is a continuation of application Ser. No. 09/355,379, filed Jul. 26, 1999 now U.S. Pat. No. 6,353,580.

SUMMARY OF THE INVENTION

The invention relates to a unitary storage medium and a method for storing on such a medium. Digital audio storage on unitary media such as disc or tape is at present widespread. If the audio is effectively sub-divided into multiple sub-items, the providing of a Table-of-Contents (TOC) allows to access the information in a relatively fast manner. Generally, a TOC file specifies at least what has been stored and where it has been stored, for facilitating access thereto in a home-type player. A lowest level TOC file, that in case of a single-level TOC structure is also the highest level TOC file, thereby points immediately to the content of the audio items or tracks. Now, such audio signals are also being used in the environment of personal computers and the like, where the scope of such use may have various extended features. An audio provider may wish to have such information straightforwardly accessible through various platforms as different as a portable player from a full-fledged multi-media engine.

In consequence, amongst other things, it is an object of the present invention to allow audio management on levels of different complexity, through providing compatible accessibility to players as well as to PC's, and in particular, through the latter's file structure. Now therefore, according to one embodiment of the invention, a lowest level directory, that in case of a single level directory structure is also the highest level or ROOT directory, contains localizing information of the associated audio items or tracks. However, such lowest level directory cannot access immediately the audio content of these tracks, but would need the appropriate application program to execute an interpretation with respect to the pertaining audio file.

Advantageous features of other embodiments provide a multi-level TOC structure, as well as a multi-level directory structure for raising access flexibility.

The embodiments also relate to a unitary storage medium produced by the method, and to a reader or player arranged for interfacing with such storage medium. Further advantageous aspects of embodiments are recited in dependent Claims.

BRIEF DESCRIPTION OF THE DRAWINGS

These and further aspects and advantages of the invention will be discussed more in detail hereinafter with reference to the disclosure of preferred embodiments, and in particular with reference to the appended Figures that show.

DETAILED DESCRIPTION TO THE INVENTION

Figure 1A:
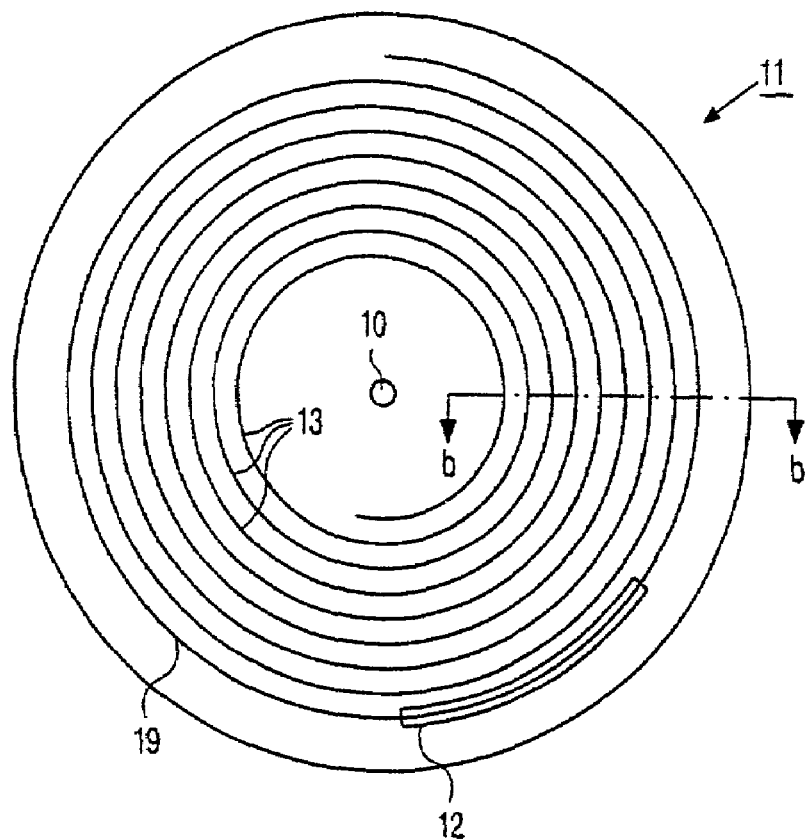
FIGS. 1a, 1b a record carrier.

FIG. 1a shows a disc-shaped record carrier 11 with track 19 and central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and later pressing consumer discs. Track 19 on the recordable record carrier is indicated by providing a pre-embossed track structure during manufacture of the blank record carrier. The track may be configured as a pregroove 14 to enable a read/write head to follow the track 19 during scanning. The information is recorded on the information layer by optically detectable marks along the track, e.g. pits and lands.

Figure 1B:
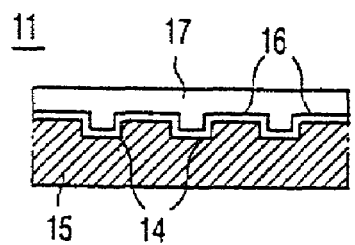

FIG. 1b is a cross-section along the line b—b of a recordable record carrier 11, wherein transparent substrate 15 carries recording layer 16 and protective layer 17. The pregroove 14 may be implemented as an indentation, an elevation, or as a material property deviating from its surroundings.

For user convenience, the audio information on the record carrier has been subdivided into items, which usually have a duration of a few minutes e.g. songs on an album or movements of a symphony. Usually the record carrier also contains access information for identifying the items, such as in a so-called Table Of Contents (TOC), or included in a file system like ISO 9660 for CD-ROM. The access information may include playing time and start address for each item, and also further information like a song title.

The TOC access mechanism specifies an actual configuration of various audio items on the unitary storage medium (e.g., the record carrier 11). Stored on the unitary storage medium is a highest level TOC file that points to the audio items, and a lowest level TOC file that points immediately to the respective contents of the audio items. Also stored on the unitary storage medium is a file-based access mechanism that includes a root directory containing item localizing information, and the root directory contains the highest level TOC file. The audio information is accessible using either the TOC mechanism or the file-based access mechanism.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64.times. Fs called bitstream. The latter method represents a high quality encoding method, with the choice between high quality decoding and low quality decoding, the latter allowing a simpler decoding circuit. Reference is made in this respect to documents D5 and D6, infra. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed dependent on the varying bitrate. The data is retrieved from the record carrier at so-called transfer speed, i.e. the speed of transferring data bytes from the record carrier to a de-compressor. Preferably the record carrier has a constant spatial data density, which gives the highest data storage capacity per unit of area. In such system the transfer speed is proportional to the relative linear speed between the medium and the read/write head. If a buffer is provided before the de-compressor, actual transfer speed is the speed before that buffer.

Figure 2:
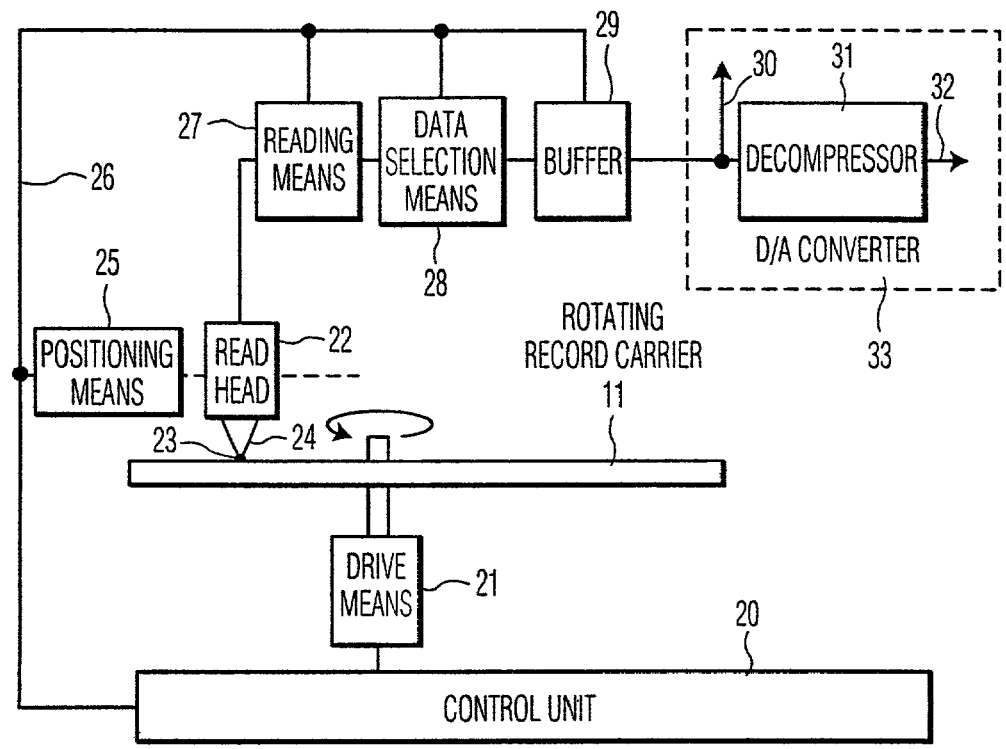
FIG. 2 a playback device.

FIG. 2 shows a playback apparatus according to the invention for reading a record carrier 11 of the type shown in FIG. 1. The device has drive means 21 for rotating record carrier 11 and a read head 22 for scanning the record carrier track. Positioning means 25 effect coarse radial positioning of read head 22. The read head comprises a known optical system with a radiation source for generating a beam 24 that is guided through optical elements and focused to spot 23 on an information layer track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted separately, e.g. in a stand-alone high quality audio digital to analog convertor (D/A convertor), as indicated by dashed rectangle 33 in FIG. 2. Alternatively, the buffer may be positioned before the data selection means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end, the control unit 20 may comprise control circuitry, such as a microprocessor, a program memory and control gates, for performing the procedures described below. Control unit 20 may be implemented as a logic circuit state machine.

The art of audio compression and de-compression is known. Audio may be compressed after digitizing by analyzing the correlation in the signal, and producing parameters for fragments of a specified size. During de-compression the inverse process is used to reconstruct the original signal. If the original digitized signal is reconstructed exactly, the (de)-compression is called lossless, whereas lossy (de)-compression will not reproduce certain details of the original signal which however are substantially undetectable by the human ear or eye. Most known systems for audio and video, such as DCC or MPEG, use lossy compression, whereas lossless compression is used for storing computer data. Examples of audio compression and decompression can be found in D2, D3 and D4 hereinafter, of which in particular the lossless compression from D2 is suitable for high quality audio.

According to the invention, data selection means 28 are arranged to retrieve from the data read certain control information. The data selection means 28 are also arranged to discard any padding or stuffing data, that had been added during recording. When the control unit 20 is commanded to reproduce an item of audio from the record carrier, the positioning means 25 are controlled to position the reading head on the portion of the track containing the TOC. The starting address for that item will then be retrieved from the TOC via the data selection means 28. Alternatively the contents of the TOC may be read only once and stored in a memory when the disc is inserted in the apparatus. For reproducing the item, the drive means 21 are controlled to rotate the record carrier at the appropriate speed indicated through extracting time codes stored with the audio, that indicate an intended duration.

To provide continuous reproduction without buffer underflow or overflow the transfer speed is coupled to the reproduction speed of the D/A converter, i.e. to the bitrate after decompression. To this end the apparatus may comprise a reference frequency source for controlling the decompressor. Alternatively or additionally the rotation rate may be adjusted using the average filling level of the buffer 29, e.g. decreasing the rotation rate when the buffer is more then 50% full on average.

Figure 3:
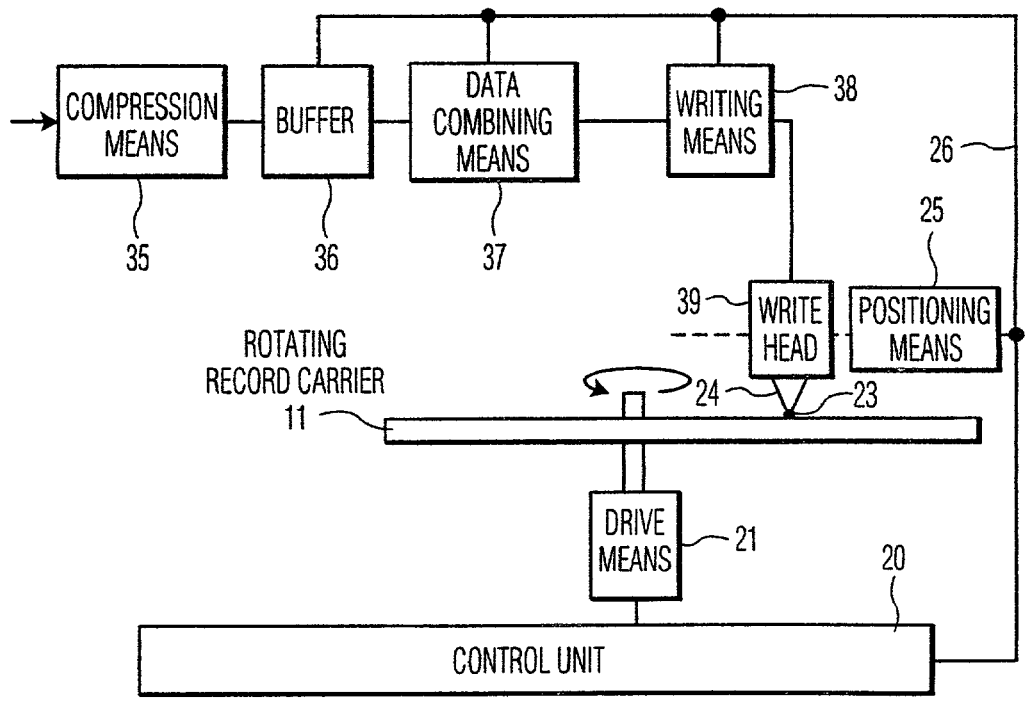
FIG. 3 a recording device.

FIG. 3 shows a recording device for writing information on a record carrier 11 according to the invention of a type which is (re)writable. During a writing operation, marks representing the information are formed on the record carrier. The marks may be in any optically readable form, e.g. in the form of areas whose reflection coefficient differs from their surroundings, through recording in materials such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation from a laser diode. The recording device comprises similar basic elements as described with reference to FIG. 2, i.e. a control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of the compression means 35 is passed to buffer 36. From buffer 36 the data is passed to data combining means 37 for adding stuffing data and further control data. The total data stream is passed to writing means 38 for recording. Write head 39 is coupled to the writing means 38, which comprise for example a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26 and for performing the positioning procedure as described above for the reading apparatus. Alternatively the recording apparatus may be arranged for reading having the features of the playback apparatus and a combined write/read head.

Figure 4:
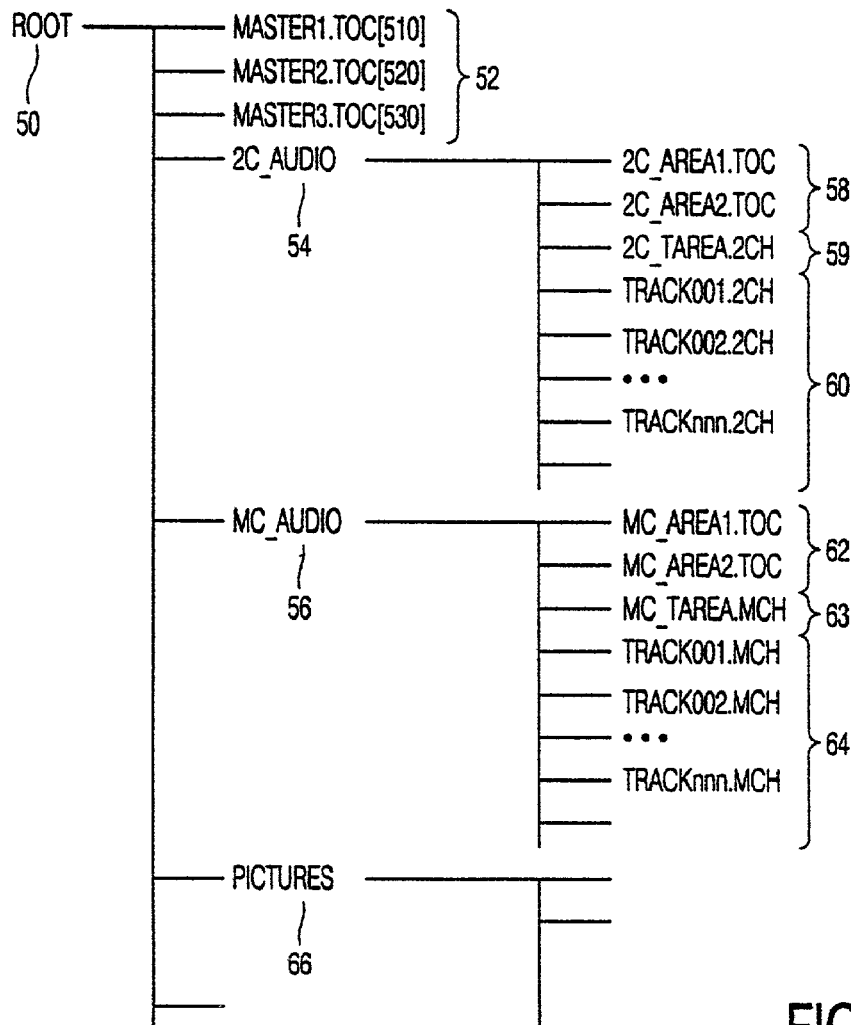
FIG. 4, a file system for use with the invention.

FIG. 4 shows a file system for use with the invention, for which in principle various options exist. As main choice the inventor has proposed that the storage medium should be based on either the UDF file system or the ISO 9660 file system, or both, which systems are by themselves standard to the skilled art person. In the alternative case, no file system should be present at all and the relevant sector spaces should be kept empty.

If a file system is present however, all audio will be stored in Audio Files. FIG. 4 has a double accessing hierarchy, as follows, Firstly, ROOT directory 50 points to MASTER TOC files 52 and furthermore to sub-directories 2C_AUDIO 54, MC_AUDIO 56, and PICTURES 66. The structure of MASTER.TOC 52 will be discussed hereinafter. Furthermore, 2C_AUDIO directory 54 points to TOC 2C_AREA.TOC 58 and in parallel therewith to the various stereo tracks TRACKn.2CH 60. Furthermore, there is MC_AUDIO directory 56. This points to TOC MC_AREA.TOC 62 and in parallel therewith to the various stereo tracks TRACKn.MCH 64. In consequence, the tracks may be accessed either via the associated directories, or rather via the file system that may have MASTER.TOC and sub-TOCS as files. However, double storage facilities therefor are superfluous, inasmuch as the directories need only to refer to the TOC or TOCS. For reasons of safety, the master TOCs have been provided in triplicate. Furthermore, the sub-TOCs or AREA.TOCs have been provided in duplicate. Next, to audio, the system may be organized for containing still further items, such as pictures that also have their directory 66. As an additional extra, 2C_TAREA.2CH 59 and MC_T-AREA.MCH contain all associated tracks.

Figure 5:
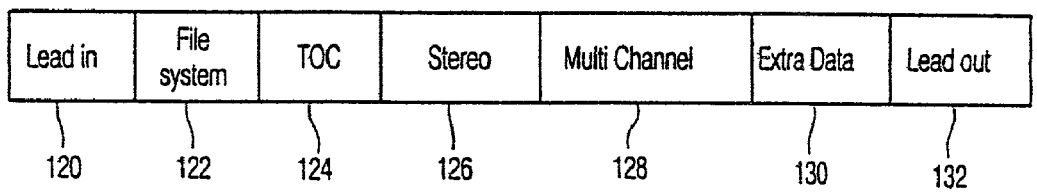
FIG. 5, a first storage arrangement for the invention.

FIG. 5 shows a first storage arrangement for use with the invention, which by way of example has been represented as a single serial track. Along the horizontal axis the following items are evident. Item 120 is a Lead-in area that is used for mutually synchronizing the reader and the driving of the medium. Item 122 represents the File System that has been disclosed with reference to FIG. 4. Item 124 represents a TOC that may be configured according to standard procedures and pertains to subsequent items Stereo Audio Item 126 and Multi-channel Audio Item 128, and if necessary also to Extra Data Item 130. The size of item 124 need not be standardized, inasmuch as various different amounts of information may be present. Item 126 represents Stereo Audio Information, that may be defined according to a conventional standard and by itself does not constitute part of the invention. Item 128 represents Multi Channel Audio Information, that may be defined according to a conventional standard and by itself does not constitute part of the invention. Generally, the two audio areas may have the same structure and contain the same piece of audio, apart from the distinguishing definitions of the various channels. The audio may be plain coded or lossless coded. All kinds of audio may be multiplexed with supplementary data, such as Compact Disc Text.

Item 130 represents Extra Data Information that may be defined in a conventional standard and by itself does not form part of the invention. Item 132 represents a Lead-Out Information. The latter is in particular used during search operations. The lead-out may cover a ring of some 0.5 to 1 millimeter wide. According to the above, the stored information may be accessed either via the file system as laid down in item 122, or via the TOC structure laid down in item 124, and more particular, via a two- or multi-level TOC structure to be discussed hereinafter.

Figure 6:
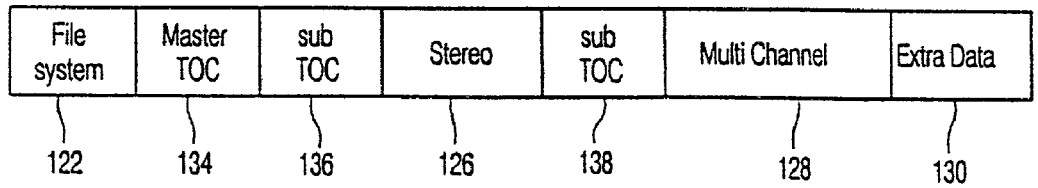
FIG. 6, a second storage arrangement for the invention.
Table 1 (FIG. 7A) specifies a Master_TOC Syntax;
Table 2 (FIG. 7B) specifies a Master_TOC_O Syntax;
Table 3 (FIG. 7C) specifies a Disc_Info Syntax.

FIG. 6 shows a second storage arrangement for use with the invention, and in particular pertaining to a two-level TOC structure. Along the horizontal axis the following items are evident, next to items that have already been shown in FIG. 3 and carry the same reference numerals. For clarity, items 120 and 132 have been suppressed.

Item 134 represents the Master TOC that begins at a uniformly standardized offset position with respect to the start of the Lead-in area at byte number 510, copies at 520, 530. According to the embodiment, the Master-TOC measures only one standard-size sector and primarily contains pointers to the various Sub-TOCs or Area-TOCs to be disclosed hereinafter. A preferred syntax of the Master-TOC has a header with a Signature that identifies the MasterTOC, such as by "SACD Master TOC". Further, Tables 1 and 2 specify the precise syntax of the MASTER_TOC. The syntax has been given in elementary computer notation, together with the associated lengths and formats.

The invention claimed is:

1. A method for storing information on a unitary storage medium, comprising the steps of:
   storing on at least one Table-of-Contents (TOC) access mechanism, wherein the TOC access mechanism contains configuration information for various items on the unitary storage medium and is capable of accessing various audio items on the unitary storage medium;
   storing a file-based access mechanism including a root directory on that is operatively coupled to the TOC access mechanism and also operatively coupled to at least one sub-directory, the at least one sub-directory being capable accessing various audio items on the unitary storage medium;
   wherein various audio items on the unitary storage medium using can be accessed using either the TOC access mechanism or the file-based access mechanism.

2. The method for storing information of claim 1 wherein the step of storing the at least one TOC mechanism further comprises storing multiple copies of a master TOC with each of the master TOC copies containing pointers to areas containing audio items.

3. The method for storing information of claim 2 wherein the step of storing the file based access mechanism further comprises the sub-directory pointing to each of the audio items as files, the file system being compatible with standard personal computer files system to allow personal computers to use the file system to read audio items in order to play audio item contents.

4. The method for storing information of claim 3 wherein the step of storing the at least one TOC mechanism further comprises storing multiple copies of the sub-TOC, each of the sub-TOC copies containing pointers to contents of the audio items to allow a stand alone audio player to play the audio items without using a file system.

5. The method for storing information of claim 4 wherein contents of the audio items pointed to by the sub-TOC being one of: audio data having just two channels or audio data having more than two channels.

6. The method for storing information of claim 5 wherein the multiple copies of the master TOC are stored in predetermined portions of a track, each of the master TOC portions each containing a predetermined number of sectors of the track.

7. The method for storing information of claim 6 wherein the root directory points to the sub-directory and to each of the copies of the master TOC as files, the sub-directory pointing to each of the copies of the sub-TOC as files and pointing to the audio items as files.

8. The method for storing information of claim 7, further comprising each of the copies of the master TOC containing pointers to each of the sub-TOC portions.

9. The method of storing information of claim 8, wherein the root directory provides an operative connection to images.

10. The method of claim 1 wherein the TOC mechanism is a single level TOC mechanism that points to various audio items on the unitary storage medium, and points immediately to respective contents of the various audio items on the unitary storage medium.

11. A unitary storage medium, comprising:
at least one Table-of-Contents (TOC) access mechanism containing configuration information for various audio items on the unitary storage medium and capable of accessing various audio items on the unitary storage medium;
a file-based access mechanism including a root directory on that is operatively coupled to the TOC access mechanism and also operatively coupled to at least one sub-directory, the at least one sub-directory being capable accessing various audio items on the unitary storage medium;
wherein various audio items on the unitary storage medium using can be accessed using either the TOC access mechanism or the file-based access mechanism.

12. The unitary storage medium of claim 11, wherein the at least one TOC mechanism further comprises a plurality of master TOC copies with each of the master TOC copies containing pointers to areas containing audio items.

13. The unitary storage medium of claim 12, wherein the file based access mechanism further comprises the sub-directory pointing to each of the audio items as files, the file system being compatible with a standard personal computer file system to allow a personal computer to use the file system to read the audio item files in order to play contents of the audio items.

14. The unitary storage medium of claim 13, wherein the at least one TOC mechanism further comprises multiple copies of the sub-TOC, each of the sub-TOC copies containing pointers to contents of the audio items to allow a stand alone audio player to play the audio items without using a file system.

15. The unitary storage medium of claim 14, wherein contents of the audio items pointed to by the sub-TOC being one of: audio data having just two channels or audio data having more than two channels.

16. The unitary storage medium of claim 15 wherein the multiple copies of the master TOC are stored in predetermined portions of a track, each of the master TOC portions each containing a predetermined number of sectors of the track.

17. The unitary storage medium of claim 16 wherein the root directory points to the sub-directory and to each of the copies of the master TOC as files, the sub-directory pointing to each of the copies of the sub-TOC as files and pointing to the audio items as files.

18. The unitary storage medium of claim 17, wherein each of the copies of the master TOC contain pointers to each of the sub-TOC portions.

19. The unitary storage medium of claim 11, wherein the root directory provides an operative connection to images.

20. The unitary storage medium of claim 11 wherein the TOC mechanism is a single level TOC mechanism that points to various audio items on the unitary storage medium, and points immediately to respective contents of the various audio items on the unitary storage medium.

21. A method, comprising the steps of:
providing a unitary storage medium;
storing audio-centered information on the unitary storage medium;
storing on the unitary storage medium, a Table-of-Contents (TOC) access mechanism specifying an actual configuration of various audio items of the audio-centered information on the unitary storage medium, and pointing to the audio items, and to multiple content items of the audio items; and
storing on the unitary storage medium, a file-based access mechanism including a root directory and pointers to files containing the audio-centered information, the root directory pointing to a file for the TOC mechanism, wherein the audio-centered information is accessible using either the TOC access mechanism or the file-based access mechanism.

22. The method of claim 21, wherein the root directory points to lower level directories that each pertain to a different standardized audio format, thereby providing an additional access mechanism the audio-center information.

23. The method of claim 22, wherein the root directory point to one or more lower level directories that each contain their own sub-TOC file, each lower level directory using a different standardized audio format.

24. The method of claim 23, wherein the number of lower level file directories is exactly equal to 2.

25. The method of claim 23, wherein the different standardized audio formats include at least a stereo format and at least a multi-channel audio format.

26. A unitary storage medium, comprising:
audio-centered information;
a Table-of-Contents (TOC) access mechanism specifying an actual configuration of various audio items of the audio-centered information on the medium, and pointing to the audio items, and to the respective contents of the audio items; and
a file-based access mechanism including a root directory and pointer to files containing the audio-centered information, the root directory pointing to a file for the TOC mechanism, wherein the audio-centered information is accessible using either the TOC access mechanism or the file-based access mechanism.

27. The unitary storage medium of claim 26, wherein:
the root directory points to a higher level TOC file and to one or more lower level file directories that each point to their own lower level TOC file;
a different respective standardized audio format used by each directory; and
the respective audio formats include at least a stereo format and at least a multi-channel audio format.

28. A reader for an optical disc, comprising:
optical reading means for producing a read signal from the optical disc;
disc driving means for moving the optical read means with respect to a track on the optical disc; and
access means for controlling the disc drive means for accessing audio-centered information stored on the optical disc using access mechanisms of the disc, the access mechanisms including:
a Table-of-Contents (TOC) access mechanism specifying an actual configuration of various audio items on the medium and pointing to audio items and to respective multiple content items of respective audio items; and
a file-based access mechanism including a root directory containing a pointer to a file for the TOC mechanism and pointers to audio items;
wherein the audio information is accessible using either the TOC access mechanism or the file-based access mechanism.

29. The reader of claim 28 wherein the TOC access mechanism further comprises a highest level TOC file pointing to audio items and a lowest level TOC file pointing immediately to respective contents of the audio items.

30. The reader of claim 29 wherein one audio items includes multiple content items.

31. The reader of claim 28 wherein at least a portion of the TOC access mechanism is located at a predetermined location to thus providing access independent of the file-based access mechanism.

32. A unitary storage medium, comprising:
a track for storing information in the form of optically readable marks, the track being logically divided into sectors;
a table of contents (TOC) system including a master TOC and a sub-TOC, multiple copies of the master TOC being stored in respective predetermined portions of the track, the master TOC portions each containing the same predetermined number of sectors of the track, the master TOC containing pointers to areas of the track containing respective audio items; multiple copies of the sub-TOC being stored in a respective portions of the track, a first portion of the sub-TOC starting at a predetermined sector of the track, the sub-TOC containing pointers to the contents of the audio items to allow a stand alone audio player to play the contents of the audio items without using a file system, the audio contents pointed to by the sub-TOC being one of: audio data having just two channels or audio data having more than two channels; and
a file system including a root directory and at least one sub-directory, the root directory pointing to the sub-directory and pointing to each of the copies of the master TOC as files, the sub-directory pointing to each of the copies of the sub-TOC as files and pointing to the audio items as files, the file system being compatible with a standard personal computer file system to allow a personal computers to use the file system to read the audio item files in order to play the contents of the audio items;
wherein the audio information is accessible using either the TOC system or the file system.

33. A method for storing information on a unitary storage medium, comprising the steps of:
providing a root directory on that is operatively coupled at least one Table-of-Contents (TOC) access mechanism, wherein the TOC access mechanism contains configuration information for various items on the unitary storage medium and is capable of accessing various items on the unitary storage medium, and wherein the root directory is operatively coupled to access various items on the unitary storage medium as a file based access mechanism;
wherein various items on the unitary storage medium using can be accessed using either the TOC access mechanism or the file based access mechanism.

34. The method for storing information of claim 33 wherein the step of providing further comprises the TOC access mechanism including a master TOC and a sub-TOC.

35. The method for storing information of claim 33 wherein the step of providing further comprises the TOC access mechanism including a master TOC with a plurality copies of the master TOC being stored on the unitary storage medium.

36. The method for storing information of claim 35 wherein the step of providing further comprises the plurality of copies of the master TOC being stored on the unitary storage medium in predetermined portions of the unitary storage medium.

37. The method for storing information of claim 36 wherein the step of providing further comprises the master TOC portions each containing an equal predetermined number of sectors of a track.

38. The method for storing information of claim 37 wherein the step of providing further comprises the master TOC containing pointers to areas of the track containing respective audio items.

39. The method for storing information of claim 38 wherein the step of providing further comprises multiple copies of a sub-TOC being stored in a respective portions of the unitary storage medium, each of the sub-TOC containing pointers to the contents of audio items allowing audio players to play audio items without using a file system.

40. The method for storing information of claim 39 wherein the step of providing further comprises each of the copies of the master TOC containing pointers to each of the sub-TOC copies.

41. The method for storing information of claim 40 wherein the step of providing further comprises the sub-TOC copies each starting at a predetermined portion of the track.

42. The method for storing information of claim 40 wherein the step of providing further comprises the audio contents pointed to by the sub-TOC being one of: audio data having just two channels or audio data having more than two channels.

43. The method for storing information of claim 39 wherein the step of providing further comprises the root directory including at least one sub-directory, the root directory pointing to the sub-directory and pointing to each of the copies of the master TOC as files, the sub-directory pointing to each of the copies of the sub-TOC as files and pointing to the audio items as files.

44. The method for storing information of claim 43 wherein the step of providing further comprises providing the file based access mechanism such that it is compatible with standard personal computer file systems allowing personal computers to use the file system and read audio item files in order to play audio item contents.

45. The method for storing information of claim 33 wherein the step of providing further comprises the file based access mechanism including at least one sub-directory to the root directory that is capable of operating with file structures used in personal computers.

46. The method for storing information of claim 33 wherein the step of providing further comprises the root directory including an operative connection to images.

47. The method for storing information of claim 33 wherein the step of providing further comprises providing the TOC mechanism as a single level TOC mechanism that points to various items on the unitary storage medium, and points immediately to respective contents of the various items on the unitary storage medium.

48. The method for storing information of claim 33 wherein the step of providing further comprises providing the TOC mechanism wherein at least a portion of the TOC access mechanism is located at a predetermined location thus providing access to various items on the unitary storage medium independent of the file-based access mechanism.

49. A unitary storage medium, comprising:
a root directory on that is operatively coupled at least one Table-of-Contents (TOC) access mechanism, wherein the TOC access mechanism contains configuration information for various items on the unitary storage medium and is capable of accessing various items on the unitary storage medium, and wherein the root directory is operatively coupled to access various items on the unitary storage medium as a file based access mechanism;

wherein various items on the unitary storage medium using can be accessed using either the TOC access mechanism or the file based access mechanism.

50. The unitary storage medium of claim 49 wherein the TOC access mechanism further comprises a master TOC and a sub-TOC.

51. The unitary storage medium of claim 49 wherein the TOC access mechanism further comprises a master TOC with a plurality copies of the master TOC being stored on the unitary storage medium.

52. The unitary storage medium of claim 51 wherein the TOC access mechanism further comprises the plurality of copies of the master TOC being stored on the unitary storage medium in predetermined portions of the unitary storage medium.

53. The unitary storage medium of claim 52 wherein the TOC access mechanism further comprises the master TOC portions each containing an equal predetermined number of sectors of a track.

54. The unitary storage medium of claim 53 wherein the TOC access mechanism further comprises the master TOC containing pointers to areas of the track containing respective audio items.

55. The unitary storage medium of claim 54 wherein the TOC access mechanism further comprises multiple copies of a sub-TOC, each copy of the sub-TOC containing pointers to the contents of audio items.

56. The unitary storage medium of claim 55 wherein each copy of the sub-TOC is stored in a respective portions of the unitary storage medium, allowing audio players to play audio items without using a file system.

57. The unitary storage medium of claim 56 wherein each of the copies of the master TOC contain pointers to each copy of the sub-TOC.

58. The unitary storage medium of claim 57 wherein each copy of the sub-TOC starts at a predetermined portion of the track.

59. The unitary storage medium of claim 55 wherein the multiple copies of the sub-TOC point to contents of audio items selected from one of: audio data having just two channels or audio data having more than two channels.

60. The unitary storage medium of claim 49 wherein the filed based access mechanism further comprises:

at least one sub-directory to the root directory, with the root directory pointing to the sub-directory and each of the copies of the master TOC as files; and at least one sub-TOC, the sub-directory pointing to the sub-TOC as a file and further pointing to audio items on the unitary storage medium as files.

61. The unitary storage medium of claim 60 wherein the file based access mechanism is compatible with standard personal computer file systems allowing personal computers to use the file system and read audio item files in order to play audio item contents.

62. The unitary storage medium of claim 49 wherein the root directory further comprises at least one sub-directory that functions as the file based access mechanism capable of operating with file structures used in personal computers.

63. The unitary storage medium of claim 49 wherein the root directory further comprises an operative connection to images.

64. The unitary storage medium of claim 49 wherein the TOC mechanism further comprises a single level TOC mechanism that points to various items on the unitary storage medium, and points immediately to respective contents of the various items on the unitary storage medium.

65. The unitary storage medium of claim 49 wherein the TOC mechanism further comprises at least a portion of the TOC access mechanism is located at a predetermined location thus providing access to various items on the unitary storage medium independent of the file-based access mechanism.

* * * * *